(12) United States Patent
Yellick et al.

(10) Patent No.: US 11,632,237 B2
(45) Date of Patent: Apr. 18, 2023

(54) CONFIGURATION OVERRIDE IN A BLOCKCHAIN NETWORK

(71) Applicant: International Business Machines Corporation, Armonk, NY (US)

(72) Inventors: Jason Karl Yellick, Raleigh, NC (US); Alessandro Sorniotti, Zurich (CH); Gari Singh, Wilmington, MA (US); Paul Brian Tippett, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 17/005,398

(22) Filed: Aug. 28, 2020

(65) Prior Publication Data

US 2022/0069976 A1  Mar. 3, 2022

(51) Int. Cl.
| *H04L 29/06* | (2006.01) |
| *H04L 9/06* | (2006.01) |
| *H04L 9/08* | (2006.01) |
| *H04L 9/32* | (2006.01) |
| *H04L 41/0813* | (2022.01) |
| *H04L 9/00* | (2022.01) |

(52) U.S. Cl.
CPC ............ *H04L 9/0637* (2013.01); *H04L 9/085* (2013.01); *H04L 9/3236* (2013.01); *H04L 9/3255* (2013.01); *H04L 41/0813* (2013.01); *H04L 9/50* (2022.05)

(58) Field of Classification Search
CPC ..... H04L 9/0637; H04L 9/085; H04L 9/3236; H04L 9/3255; H04L 41/0813; H04L 2209/38; H04L 41/0873; H04L 41/0816
See application file for complete search history.

(56) References Cited

U.S. PATENT DOCUMENTS

| 10,389,518 | B2 | 8/2019 | Chen et al. | |
| 2018/0091316 | A1* | 3/2018 | Stradling | G06F 12/1408 |
| 2018/0285840 | A1* | 10/2018 | Hasan | G06F 15/177 |
| 2018/0322597 | A1* | 11/2018 | Sher | G06Q 20/3821 |
| 2019/0207767 | A1 | 7/2019 | Ahn | |
| 2019/0265690 | A1* | 8/2019 | Mattingly | H04L 9/3239 |
| 2020/0076827 | A1* | 3/2020 | Gluck | H04L 63/123 |
| 2020/0133943 | A1* | 4/2020 | Yim | G06Q 20/389 |
| 2020/0210170 | A1* | 7/2020 | Johnson | H04L 9/3239 |
| 2020/0250753 | A1* | 8/2020 | Blount | H04L 9/0637 |
| 2020/0294037 | A1* | 9/2020 | Srivastava | G06Q 20/3821 |
| 2020/0402190 | A1* | 12/2020 | Nelluri | H04W 4/70 |
| 2021/0081216 | A1* | 3/2021 | Komarov | G06F 9/44505 |

(Continued)

OTHER PUBLICATIONS

"Method and System for Privacy-Preserving Authentication Based on Blockchain," IP.com, IP.com No. IPCOM000255211D, IP.com Electronic Publication Date: Sep. 10, 2018, 6 pages.

(Continued)

*Primary Examiner* — Mahfuzur Rahman
(74) *Attorney, Agent, or Firm* — Jared C. Chaney

(57) ABSTRACT

A node in a blockchain network may generate a configuration override for the blockchain network, approve the configuration override by the blockchain network, transmit the approval for the configuration override to peers in the blockchain network, and submit the configuration override to the blockchain network for validation. The validation will be based on the configuration override matching the approval.

17 Claims, 14 Drawing Sheets

(56) References Cited

U.S. PATENT DOCUMENTS

| | | | | |
|---|---|---|---|---|
| 2021/0201257 A1* | 7/2021 | Mohamed | ............ | G06Q 10/087 |
| 2021/0226951 A1* | 7/2021 | Goldstein | ............. | H04L 63/104 |
| 2021/0289001 A1* | 9/2021 | Wilson | ................. | H04L 63/101 |

OTHER PUBLICATIONS

"Method and System for Articulating Blockchain Business Network Assurance," IP.Com, IP.com No. IPCOM000257727D, IP.com Electronic Publication Date: Mar. 6, 2019, 5 pages.

"System and Method for Scalable Proof-of-Work Based Decentralized Crypto Ledgers," IP.Com, IP.com No. IPCOM000246245D, IP.com Electronic Publication Date: May 19, 2016, 12 pages.

"Blockchain Transactional Risk Factor," IP.Com, IP.com No. PCOM000248078D, IP.com Electronic Publication Date: Oct. 24, 2016, 3 pages.

Kwon, J. et al., "COSMOS—A Network of Distributed Ledgers," White Paper, Printed Aug. 21, 2020, 53 pages.

Dudley, E., "Blockchain and Ranked Choice Voting," Computer Science, Rochester Institute of Technology, Apr. 22, 2019, 46 pages.

Natoli et al., "Deconstructing Blockchains: A Comprehensive Survey on Consensus, Membership and Structure," arXiv: 1908.083161, Aug. 22, 2019, 43 pages.

Homoliak et al., "A Security Reference Architecture for Blockchains," arXiv: 1904.06898v1, Apr. 15, 2019, 11 pages.

Blenkinsop, "How to Recover Your Wallet if Your Private Keys Are Lost," Cointelegraph, Bequant, Nov. 16, 2018, 2 pages, https://cointelegraph.com/news/how-to-recover-your-wallet-if-your-private-keys-are-lost.

Matrixoneken, "How can I recover an existing node to an existing network #506," JP Morgan Chase, Quorum, Aug. 28, 2018, 3 pages, https://github.com/jpmorganchase/quorum/issues/506.

"Node administration," Corda Documentation, API: Kotlin/Javadoc, Printed Aug. 26, 2020, 30 pages https://docs.corda.net/docs/corda-os/4.5/node-administration.html#file-backups.

* cited by examiner

CONFIGURATION OVERRIDE IN A BLOCKCHAIN NETWORK

BACKGROUND

The present disclosure relates generally to the field of blockchain channel configuration, and more specifically to configuration override in a blockchain network.

Blockchains offer immutability of data by replicating data across all nodes of a network. In order to be able to validate the blockchain, nodes must have access to the complete history of transactions, which any data on the chain is visible for all participants.

A hard fork is a rule change such that the software validating according to the old rules may see the blocks produced according to the new rules as invalid. In case of a hard fork, all nodes meant to work in accordance with the new rules may need to upgrade their software.

If one group of nodes continues to use the old software while the other nodes use the new software, a permanent split can occur.

SUMMARY

Embodiments of the present disclosure include a method, system, and computer program product for a configuration override in a blockchain network.

Some embodiments of the present disclosure can be illustrated by a method comprising, generating a configuration override for a blockchain network, approving the configuration override by the blockchain network, transmitting the approval for the configuration override to peers in the blockchain network, and submitting the configuration override to the blockchain network for validation, wherein the validation is based on the configuration override matching the approval.

Some embodiments of the present disclosure can also be illustrated by a system comprising a memory, and a processor in communication with the memory, the processor being configured to perform operations comprising: generating a configuration override for a blockchain network, approving the configuration override by the blockchain network, transmitting the approval for the configuration override to peers in the blockchain network, and submitting the configuration override to the blockchain network for validation, wherein the validation is based on the configuration override matching the approval.

Some embodiments of the present disclosure can also be illustrated by a computer program product comprising a computer readable storage medium having program instructions embodied therewith, the program instructions executable by a processor to cause the processors to perform a function, the function comprising generating a configuration override for a blockchain network, approving the configuration override by the blockchain network, transmitting the approval for the configuration override to peers in the blockchain network, and submitting the configuration override to the blockchain network for validation, wherein the validation is based on the configuration override matching the approval.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
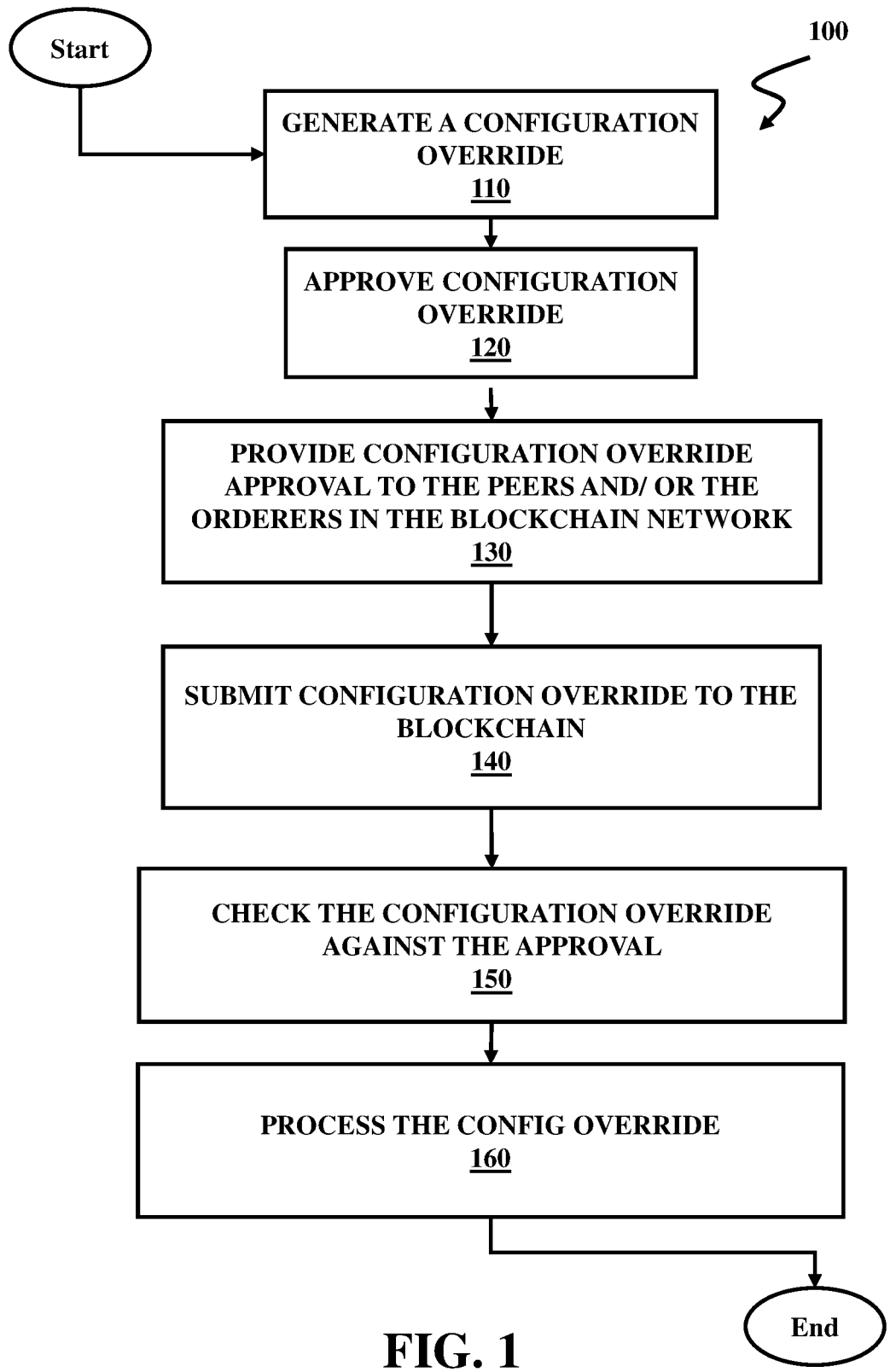
FIG. 1 illustrates a flow diagram of for a configuration override in a blockchain network, according to example embodiments.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of forking in blockchain networks, and more specifically to configuration overrides in a blockchain network.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow. Also, any device depicted in the drawings can be a different device. For example, if a mobile device is shown sending information, a wired device may also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Detailed herein is a method, system, and computer program product that utilize blockchain (e.g., Hyperledger Fabric) channels, and smart contracts that implement logic based on a non-interactive zero knowledge proof.

In some embodiments, the method, system, and/or computer program product utilize a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency.

In various embodiments, a permissioned and/or a permission-less blockchain can be used. In a public or permission-less blockchain, anyone can participate without a specific identity (e.g., retaining anonymity). Public blockchains can involve native cryptocurrency and use consensus based on various protocols such as Proof of Work. On the other hand, a permissioned blockchain database provides secure interactions among a group of entities which share a common goal but which do not fully trust one another, such as businesses that exchange funds, goods, information, and the like.

Further, in some embodiments, the method, system, and/or computer program product can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The method, system, and/or computer program product can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded.

An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

In some embodiments, the method, system, and/or computer program product can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node).

Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing/confirming transactions and modifying a world state of the blockchain, which is another name for the initial blockchain transaction which normally includes control and setup information.

In some embodiments, the method, system, and/or computer program product can utilize a ledger that is a sequenced, tamper-resistant record of all state transitions of a blockchain. State transitions may result from chaincode invocations (e.g., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

In some embodiments, the method, system, and/or computer program product described herein can utilize a chain that is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (e.g., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include a method, system, and computer program product for blockchain configuration overrides in a blockchain network. The exemplary embodiments solve the issues of reliability, time, and trust by extending features of a database such as immutability, digital signatures, and being a single source of truth. The exemplary embodiments provide a solution for accounting for regulations in multiple jurisdictions. The blockchain networks may be homogenous based on the asset type and rules that govern the assets based on the smart contracts.

Blockchain is different from a traditional database in that blockchain is not a central storage, but rather a decentralized, immutable, and secure storage, where nodes may share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system described herein is implemented due to immutable accountability, security, privacy, permitted decentralization, availability of smart contracts, endorsements and accessibility that are inherent and unique to blockchain.

In particular, the blockchain ledger data is immutable and that provides for an efficient method for configuration overrides. Also, use of the encryption in the blockchain provides security and builds trust. The example blockchains may be permission decentralized. Thus, each end user may have its own ledger copy to access. Multiple organizations (and peers) may be on-boarded on the blockchain network. The key organizations may serve as endorsing peers to validate the smart contract execution results, read-set and write-set. In other words, the blockchain inherent features provide for efficient implementation of processing a private transaction in a blockchain network.

One of the benefits of the example embodiments is that it improves the functionality of a computing system by implementing a method for processing a private transaction in a blockchain network. Through the blockchain system described herein, a computing system (or a processor in the computing system) can perform functionality for private transaction processing utilizing blockchain networks by providing access to capabilities such as distributed ledger, peers, encryption technologies, MSP, event handling, etc. Also, the blockchain is enabled to create a business network and make any users or organizations on-board for participation. As such, the blockchain is not just a database. The blockchain comes with capabilities to create a network of users and on-board/off-board organizations to collaborate and execute service processes in the form of smart contracts.

The example embodiments provide numerous benefits over a traditional database. For example, through the blockchain the embodiments provide for immutable accountability, security, privacy, permitted decentralization, availability of smart contracts, endorsements and accessibility that are inherent and unique to the blockchain.

Blockchain systems may enter into a state where desired changes to the network are no longer possible. An example of this is when cryptographic secrets, such as individual wallet keys (permissionless) or administrative keys (e.g., permissioned keys, such as those for hyperledger fabric) are lost or compromised. Other issues may also arise such as irreversible configuration mistakes that accidentally burn a large quantity of tokens or mistakes such as setting an impossible requirement for a configuration (e.g., require 3 administrators to agree when there are only 2 administrators).

One traditional solution is to hard fork the blockchain. In some instances, a hard fork may add special case handling of the fork event to the blockchain's codebase. A hard fork generally requires a significant development effort to create. Likewise, maintaining a platform with forks is risky and may lead to new (accidental) forks. For example, there may be an error in the hard fork changes or unintended consequences from the hard fork changes. Generally, a hard fork requires a code upgrade for all participants and potentially requires an audit of code from all participants. Further, editing the code base to correct the problem is also possible. This option is very time consuming since it requires reprocessing from block 0 and the network must re-run everything including the special (broken rules). Editing the code base can also create special maintenance problems.

Another possible solution is to revert to a backup network protocol. However, reverting to a backup may also introduce significant issues. First, every member of the network must have a copy of the backup before a revert is possible. Specifically, not all data must be present on the blockchain, in fact, some data (in hyper ledger fabric referred to as "private data") explicitly is not on the blockchain, as it is not meant to be public. So, every member must have a synchronized backup, to avoid data loss. Likewise, synchronizing exactly when and how to revert can be challenging. Finally, all changes to the network since the backup may be lost. On top of all of this, reverting to a backup violates the immutability principle of blockchain.

Aspects of this disclosure relate to addressing some of the problems outlined above via a system and method for introducing a configuration override in a blockchain network.

Referring now to FIG. 1, illustrated is a flowchart of an example method 100 for a configuration override in a blockchain network, in accordance with embodiments of the present disclosure. In some embodiments, the method 100 is performed by a processor on a blockchain network or in communication with a blockchain network.

Method 100 starts with block 110 where an organization in a blockchain network generates a configuration override. In some embodiments, organizations are entities that own or control one or more peers. In some embodiments, actions taken by an organization may actually be performed by an authorized user (e.g., an administrator) for an organization. In some embodiments, the configuration override is a transaction that specifies a new channel configuration, similar to a channel configuration, but may bypass some normal validations. See FIG. 5B for more details on channels.

Shared configurations for a blockchain network may be stored in a collection of configuration transactions, one per channel. A channel configuration (sometimes referred to as a configtx, or channel configuration transaction) may be versioned, permissioned, and hierarchical. First, all elements of the configuration may have an associated version which is sequentially changed with every modification. Further, every committed configuration may receive a sequence number. Second, each element of the configuration may have an associated policy which governs whether or not modification to that element is permitted. A node in the network with a copy of the previous configtx may verify the validity of a new config based on the policies in the previous configtx. Finally, a root configuration group may contain sub-groups, and each group of the hierarchy may have associated values and policies. These policies may take advantage of the hierarchy to derive policies at one level from policies of lower levels.

In some embodiments, the configuration override may bypass transaction rules of a blockchain network. Unlike normal configuration transactions, the configuration override may bypass normal validations. In some instances, correcting issues in a blockchain network may not be possible using normal validations. For example, organization A may have a fire in its datacenter which results in organization A losing its blockchain keys. Normally, one of the options discussed above (traditional hard fork, reverting to a backup, etc.) may have to be enacted to generate new keys. However, in some embodiments, a configuration override is created allowing a one-time change to the blockchain configuration bypassing normal rules that may be applied to a configuration update. Typically, there are rules about how the configuration may be modified. For example, to issue new keys to organization A, signatures are required from X, Y, and Z. Here X, Y, and Z may be organizations (such as organization A) or nodes (such as a node owned by organization A). As would be understood by one of skill in the art, if X is organization A or one of the nodes of organization A and organization A has lost its keys, the rules can no longer be satisfied for making a configuration update to give organization A new keys. The ability to force a new channel configuration may be able to fix many of the problems (for example, losing an administrative key, misconfiguring policies etc.) that arise in blockchain networks. It will be understood that the actions taken by an organization or node may be performed by and administrator or user of the organization or node. For example, if it is stated that "organization signatures are required to issue new keys," the signatures may be provided by an administer or certified user of the organization.

Method 100 continues with block 120 where the configuration override is approved. In some embodiments, each organization in a network (such as a hyperledger fabric network) may approve the configuration override out-of-band. More details of an out-of-band approval are provided in FIG. 2. In some embodiments, approval in a network (such as a crypto or Ethereum based network) may be determined with a threshold signature scheme. More details of the threshold signature scheme process are provided in FIG. 3. In some embodiments, not all organizations must agree for a configuration override to progress. For example, if only organization A approved a configuration override, only the organization A peers may process the config override in block 160 as described herein. This may produce a split, as described herein. Other options are possible, for example, a portion of organizations may approve a configuration override or all organizations may approve a configuration override.

Method 100 continues with block 130 where the configuration override approval is provided to the peers and/or the orderers in the blockchain network. Possible ways of providing the approval to the peers are discussed in FIG. 2 and FIG. 3. In some embodiments, only peers that belong to organizations that approve the configuration override may have access to the configuration override approval. For example, if organization A and organization B approve the configuration override, they may send a configuration override to peers that organization A and organization B own. If organization C does not approve the configuration override, it may not send an approval to the peers that organization C owns. In some embodiments, the configuration override approval may be available to all peers, but only peers associated with organizations that have agreed to follow a threshold signature scheme may approve the configuration override. See FIG. 3 for more details.

Method 100 continues with block 140 where the configuration override is submitted to the blockchain to be committed to a block. For example, the submission may be directly to the orderers for inclusion in a block. Other options will be apparent to one skilled in the art. For example, the configuration override may be sent to the peers in the same way that other transactions may be sent, but the configuration override may bypass one or more rules that a typical transaction must follow. In some embodiments, the configuration override may include one or more notifications or metadata tags that identify it as a configuration override or alert the system to configuration override special transactions. For example, the configuration override may include a notification to check it against an approved configuration override list.

Method 100 continues with block 150 where the peers check the submitted configuration override transaction against the configuration override approval. If the transaction does not match, the peer may reject the configuration override. In some embodiments, the peers may check a received configuration override against a configuration override approval to see if there are any differences. For example, if the configuration override approval is for "rekeying of organization A, on Jun. 16, 2020," and a configuration override to "rekey organization A" is received on Jun. 16, 2025, the system may reject the configuration override since it does not match the approval. In some embodiments, the configuration override approval may be a hash of the configuration override, and thus the peers may be able to compare the configuration override to a hash of the configuration override. Due to the nature of a hash function, in some embodiments, the peer may only approve the configuration override if it matches the hash of the configuration override approval. For example, if there is any change to the configuration override it may not match the hash, and thus the configuration override may be rejected.

In some embodiments, where a threshold signature scheme is involved, only peers belonging to organizations that have agreed to the threshold signature scheme may view an approval that matches a configuration override as a match. For example, organization A, and B may satisfy the signature requirements of a threshold signature scheme, but organization C does not agree the threshold signature scheme. If an approval is signed and recorded on the blockchain network, the peers of organization C may not recognize it as an approval since organization C has not agreed to the threshold signature scheme. See FIG. 3 for more details on a threshold signature scheme.

If some of the peers accept the configuration override, because they have a matching configuration override approval, and some of the peers reject the configuration override because they do not have a configuration override approval, the blockchain may split such that there are two blockchain networks. The split may be temporary. For example, if there are 50 nodes in a blockchain network and 25 initially validate the configuration override (because they have received a matching configuration override approval) and 25 do not (because they have not received a configuration override approval), the two networks (one for the nodes that validated the change and one for those that did not) may not be compatible (e.g., 25 recognize the new keys for organization A and 25 do not). If later all 50 validate the configuration override (because they have received a configuration override approval at this point in time), they may again interface as a single blockchain network. In some embodiments, since the approvals are done before the configuration override is submitted, the configuration override may be simply valid or invalid at commit time. For nodes which approved the override, the override commits as valid, and the new configuration takes place. For those nodes which did not validate it, the block (e.g., config override block) is rejected and those nodes may retain the old configuration. If a node later approves the block, the node may need to essentially discard their state, and reprocess the blockchain from some point before the config override was committed. If the transaction matches an approved configuration override, the method may continue to block 160.

Method 100 continues with block 160 where the system processes the configuration override. For example, a new set of keys may be generated for organization A and the keys may be enabled in place of the old keys of organization A. In some embodiments, the configuration override may be processed and adopted in a similar manner as other configuration transactions. See FIGS. 7A and B for more details on how a transaction is processed in a blockchain system.

Figure 2:
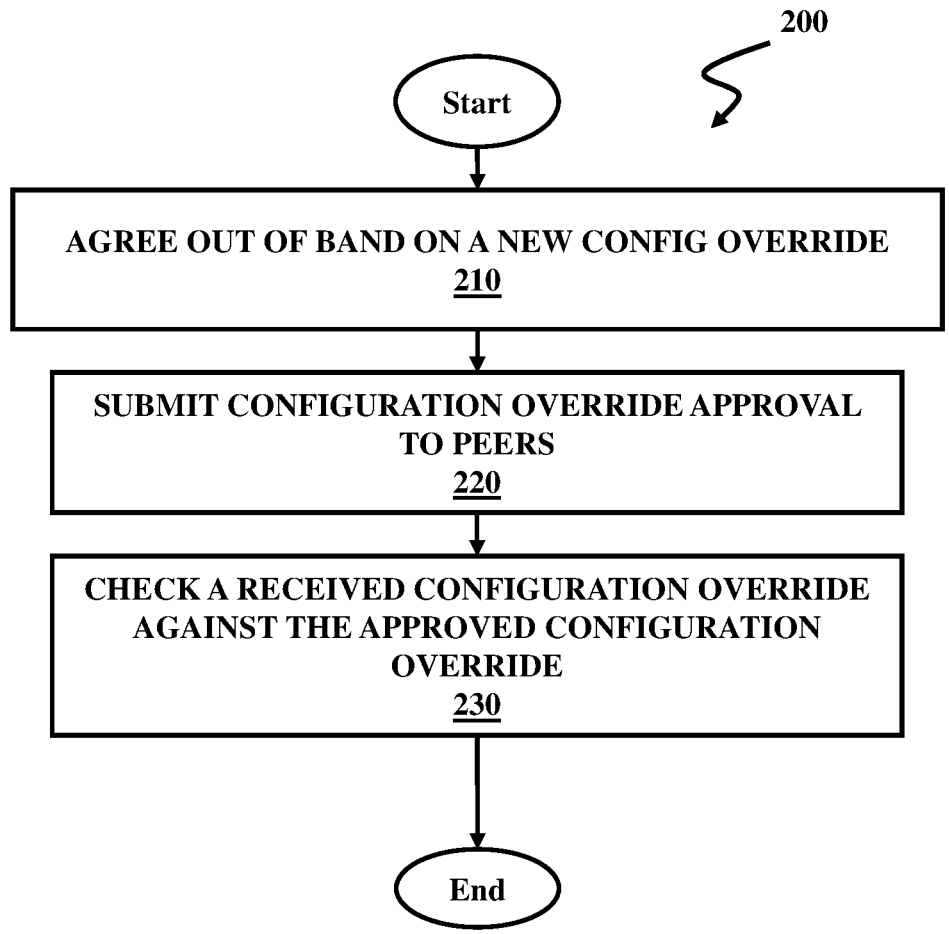
FIG. 2 illustrates a flow diagram of a configuration override approval in a blockchain network, according to example embodiments.

Referring now to FIG. 2, illustrated is a flowchart of an example method 200 for a configuration override approval in a blockchain network, in accordance with embodiments of the present disclosure. In some embodiments, the method 200 is performed by a processor on a blockchain network or in communication with a blockchain network.

The method 200 starts with block 210 where each organization approves, out-of-band, a configuration override. In some instances, out-of-band data is data transferred through a stream that is independent from the main in-band data stream. An out-of-band data mechanism provides a conceptually independent channel, which allows any data sent via that mechanism to be kept separate from in-band data. In this context, out-of-band data may be a way of transferring data or approving a transaction outside of the normal blockchain network. Some examples of out-of-band communication may include, email, phone calls, or even meeting in person to approve the override. For example, if organization A's keys are lost in a fire, the three organizations of a blockchain (A, B, and C) may engage in a video chat call (possibly with authorized users) to discuss the loss of the keys and a configuration override to give organization A a new set of keys. A proposed configuration override may be sent from organization A to organization B and organization C (e.g., with the video chat interface or with an email) and, each organization may agree to the configuration override. Other possible out-of-band communications and ways of transferring a proposed configuration override are possible.

In some embodiments, each organization may have the ability to approve or not approve the configuration override. If the configuration override is approved by an organization, an approval may be sent to the peers as an approval in block 220. If the configuration override is not approved by an organization, the organization and its peers may not validate the configuration override and the new configuration provided therein may not be adopted by the organization, or the peers of the organization, that do not approve the configuration override.

Block 220 also includes submitting a configuration override to the peers of the network. In some embodiments, a configuration override approval contains a copy of the configuration override and/or an identifier for the configuration override. In some embodiments, a configuration override may be a hash of the configuration override transaction. In some instances, hash functions and their associated hash tables are used in data storage and retrieval applications to access data in a small and nearly constant time per retrieval. In some instances, hash functions use storage space only fractionally greater than the total space required for the data or records themselves. In some embodiments, the submitting may be performed by recording an organization's approval on the blockchain ledger. For example, organization B may record an approval on the blockchain ledger and each peer that organization B owns may retrieve the approval.

In some embodiments, the configuration override approval is submitted for each organization or node for inclusion in their approved config override list. For example, a user with the authority for organization B may upload the configuration override to all the nodes owned by organization B. For example, an administrator node for organization C may transmit the configuration override to the nodes owned or associated with organization C. In some embodiments, a config override list may detail some or all approved transactions or configuration overrides that can be validated without the typical system requirements, as discussed herein. For example, organization B may send a hash of a transaction to "rekey organization A" to all of its peers for inclusion on a configuration override list. The peers may be configured to validate any configuration override that matches a configuration override approval without enacting the approval rules of the system. Other ways of directing a peer to validate a configuration override transaction may be possible.

The method 200 continues with block 230 where peers check a received configuration override against the approved configuration override. In some embodiments, a single organization may have multiple peers and may provide each peer with a configuration override list. An organization may approve a configuration override for inclusion in the list of approved configuration overrides. If a configuration override is received that matches a configuration override approval, the peer may validate the transaction. For example, if organization B sends a configuration override approval (to rekey organization A) to the peers that organization B owns, and those peers receive a configuration override to rekey organization A, the peers may validate the configuration override. If a configuration override does not match a configuration override approval, the peer may not validate the configuration override. For example, if organization B sends a configuration override approval (to rekey organization A) to the peers that organization B owns and those peers receive a configuration override to rekey organization C, the peers may not validate the configuration override.

Figure 3:
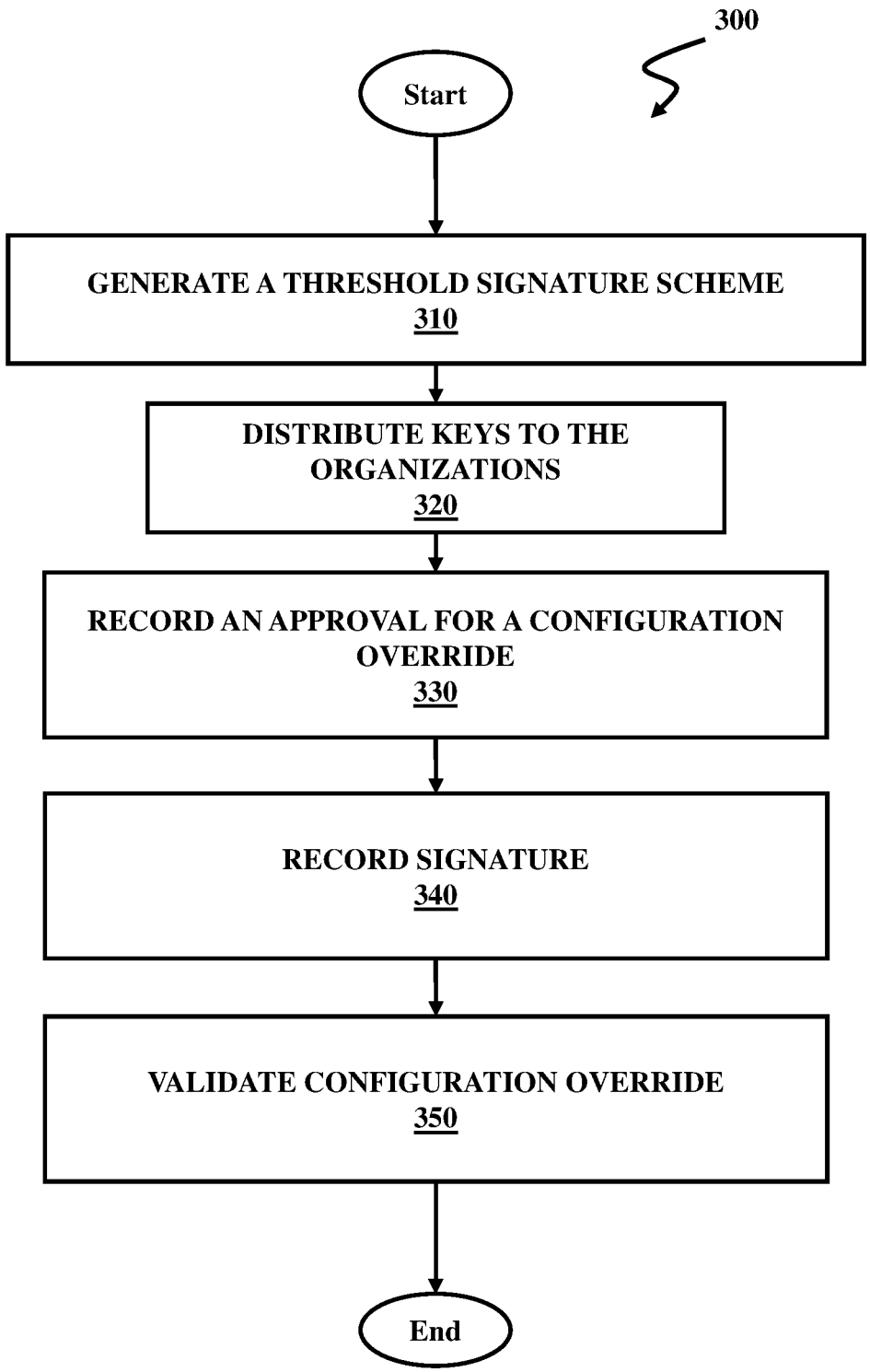
FIG. 3 illustrates a flow diagram approval of a configuration override in a blockchain network utilizing a threshold signature scheme, according to example embodiments.

Regarding FIG. 3, illustrated is a flowchart of an example method 300 for approval of a configuration override in a blockchain network (such as a crypto or Ethereum based network) utilizing a threshold signature scheme.

The method 300 begins at operation 310 where a threshold signature scheme is generated. In some embodiments, a threshold signature scheme is a set of rules for approving a configuration override. In some instances, a threshold signature scheme is a cryptosystem that protects information by encrypting it and distributing it among a cluster of fault-tolerant computers. The message is encrypted using a public key, and the corresponding private key is shared among the participating organizations. With a threshold cryptosystem, in order to sign a message, several parties (more than some cryptographic threshold number) must cooperate in the signature protocol. For example, if n is the number of parties and t is the threshold, at least t parties are required for creating a signature while less than t may not be able to create a signature. That is, that the total number of approving parties must surpass a cryptographic threshold.

In some embodiments, owning a minimum number of nodes (as defined by the threshold signature scheme) may be required to obtain a share of the private key (sometimes referred to herein as a "minimum stake"). For example, a minimum stake to get a share may be a 5% stake in the nodes of the network. In some instances, a stake is a right or ownership of the blockchain network in some aspect. For example, in a cryptocurrency example, the process of staking involves locking up an amount of a given cryptocurrency in a wallet to participate in the operation of a blockchain in return for rewards. Theoretically, anyone may participate in staking on a blockchain operating with a proof-of-stake consensus. Proof-of-stake may have several variations, which also allow people to participate in staking. In some embodiments, the signature scheme may dictate how the shares are distributed. For example, a 15% stake may give an organization a 15% share (e.g., where a 15% share equates to 15% ownership) of the private key, or one key may be distributed to every organization that has a stake of 5% or more. In some embodiments, share of a key imbues the ability to vote for a signature (e.g., approval) of a configuration override. For example, organizations A, B, and C, each with a 20% stake, each receive a 20% share of a private key.

In some embodiments, each organization and/or peer may agree or not agree to the threshold signature scheme. If an organization does not agree it may not adopt the configuration override. As discussed above, this may effectively split the organization from the blockchain network. For example, if a configuration override is approved by all organizations on the blockchain network except organization D, the nodes of organization D may not process the configuration override and split from the network.

The method continues with block 320 where keys are distributed to the organizations. In some embodiments, an organization that qualifies under the signature scheme may obtain a share of the key. For example, if organization B has a 5% stake (minimum stake required to obtain a share of the private key by the signature scheme), organization B may obtain a share of the private key.

The method continues with block 330 where an organization with a private key records an approval for a configuration override. In some embodiments, the organization may record a transaction on the blockchain network using a private key. For example, organization B, with a private key, may record an approval for a configuration override on the blockchain network.

The method continues with block 340 where a signature for the configuration override is recorded on the blockchain network after the signature scheme has been satisfied. In some embodiments, the signature represents an approval for the configuration override. For example, peers may be directed to approve a configuration override with a matching valid signature recorded on the ledger. In some embodiments, after enough organizations with signatures have cooperated with the signature procedure, a signature approving the configuration override may be recorded on the ledger. In some embodiments, the signature may contain a hash of the configuration override.

The method continues with block 350 where the peers validate a configuration override that has a signature recorded on the blockchain network. In some embodiments, when a peer receives a configuration override it may compare the configuration override to the ledger and validate the configuration override if there is a matching signature for the configuration override on the ledger. For example, if a peer receives a configuration override to rekey organization A, the peer may check the configuration override to determine if there is a matching signature for the "rekey organization A" configuration override. If there is a matching signature, the peer may validate a rekey for organization A.

Figure 4:
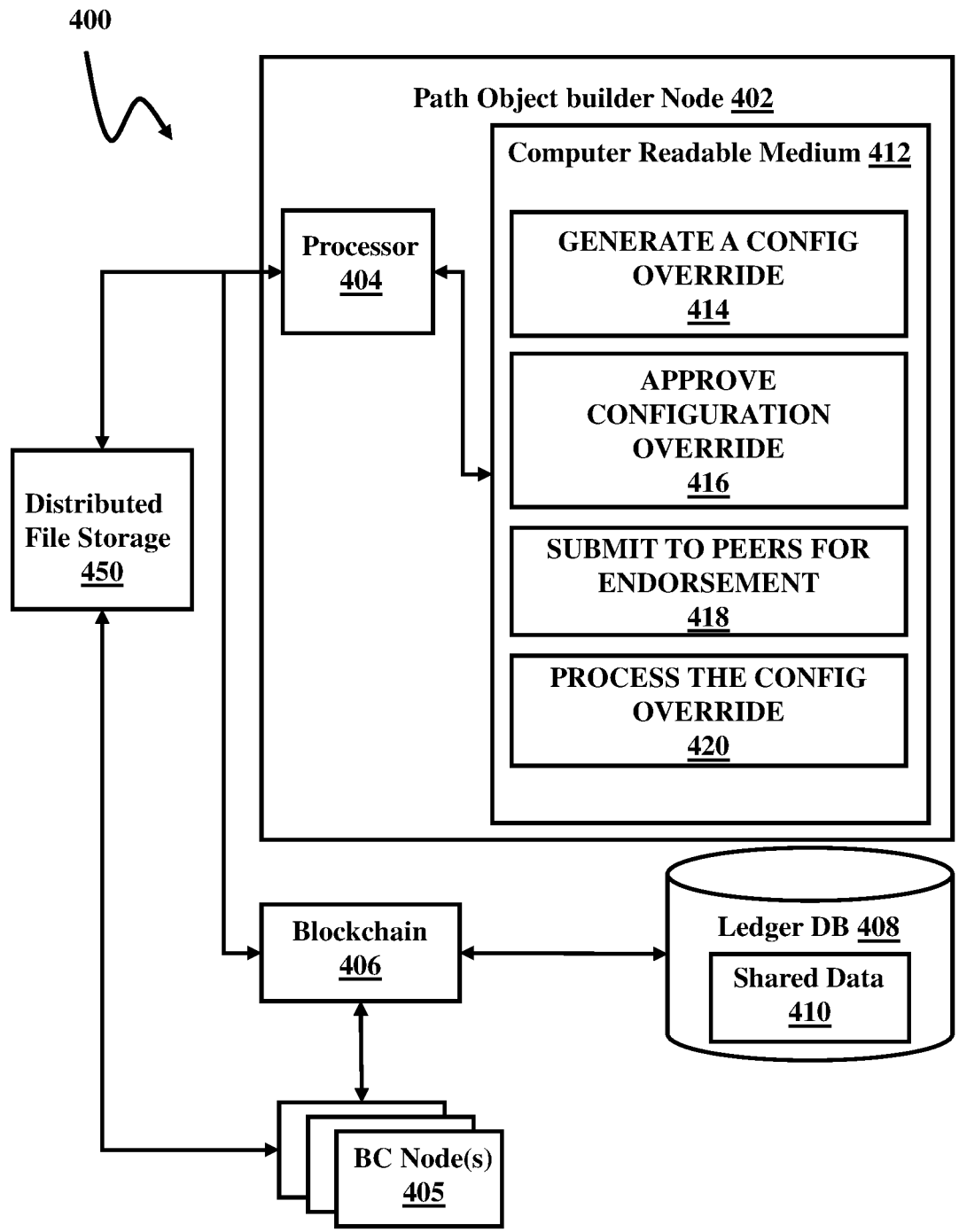
FIG. 4 illustrates a network diagram of a system including a database, according to an example embodiment.

FIG. 4 illustrates a logic network diagram for smart data annotation in blockchain networks, according to example embodiments.

Referring to FIG. 4, the example network 400 includes a path object builder node 402 connected to other blockchain (BC) nodes 405 representing document-owner organizations. The path object builder node 402 may be connected to a blockchain 406 that has a ledger 408 for storing data to be shared (410) among the nodes 405. While this example describes in detail only one path object builder node 402, multiple such nodes may be connected to the blockchain 406. It should be understood that the path object builder node 402 may include additional components and that some of the components described herein may be removed and/or modified without departing from a scope of the path object builder node 402 disclosed herein. The path object builder node 402 may be a computing device or a server computer, or the like, and may include a processor 404, which may be a semiconductor-based microprocessor, a central processing unit (CPU), an application specific integrated circuit (ASIC), a field-programmable gate array (FPGA), and/or another hardware device. Although a single processor 404 is depicted, it should be understood that the path object builder node 402 may include multiple processors, multiple cores, or the like, without departing from the scope of the path object builder node 402 system. A distributed file storage 450 may be accessible to processor node 402 and other BC nodes 405. The distributed file storage may be used to store documents identified in ledger (distributed file storage) 450.

The path object builder node 402 may also include a non-transitory computer readable medium 412 that may have stored thereon machine-readable instructions executable by the processor 404. Examples of the machine-readable instructions are shown as 414-420 and are further discussed below. Examples of the non-transitory computer readable medium 412 may include an electronic, magnetic, optical, or other physical storage device that contains or stores executable instructions. For example, the non-transitory computer readable medium 412 may be a Random Access memory (RAM), an Electrically Erasable Programmable Read-Only Memory (EEPROM), a hard disk, an optical disc, or other type of storage device.

The processor 404 may execute the machine-readable instructions 414 to generate a configuration override. As discussed above, the blockchain ledger 408 may store data to be shared among the nodes 405. The blockchain 406 network may be configured to use one or more smart contracts that manage transactions for multiple participating nodes. Documents linked to the annotation information may be stored in distributed file storage 450. The processor 404 may execute the machine-readable instructions 416 where the configuration override is approved. The processor 404 may execute the machine-readable instructions 418 where the configuration override approval is provided to the peers in the blockchain network. The processor 404 may execute the machine-readable instructions 420 where the system will adopt the configuration override.

Figure 5A:
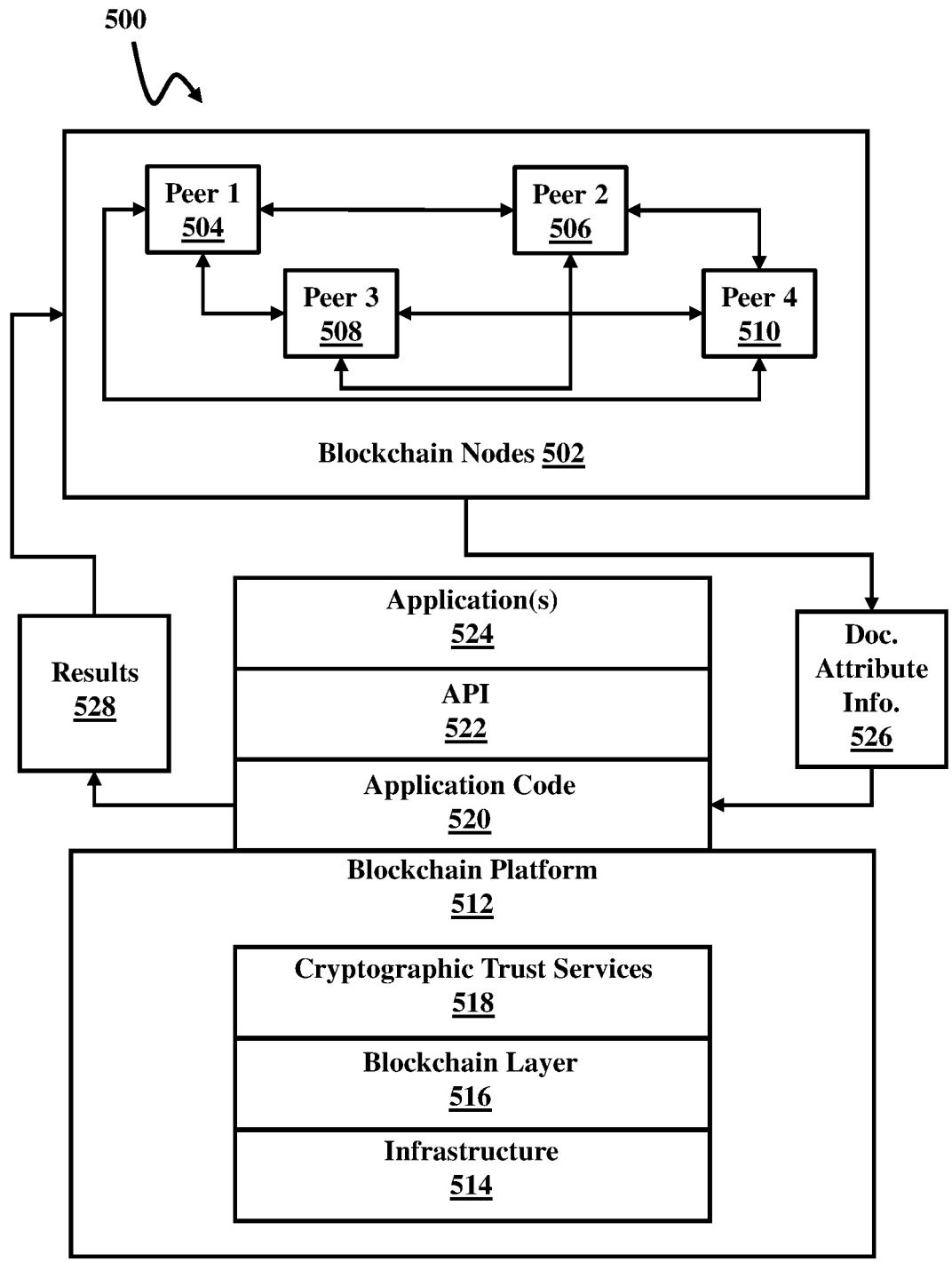
FIG. 5A illustrates an example blockchain architecture configuration, according to example embodiments.

FIG. 5A illustrates a blockchain architecture configuration 500, according to example embodiments. Referring to FIG.

5A, the blockchain architecture 500 may include certain blockchain elements, for example, a group of blockchain nodes 502. The blockchain nodes 502 may include one or more peer nodes 504-510 (these four nodes are depicted by example only). These nodes participate in a number of activities, such as blockchain transaction addition and validation process (consensus). One or more of the blockchain nodes 504-510 may endorse transactions based on endorsement policy and may provide an ordering service for all blockchain nodes in the architecture 500. A blockchain node may initiate a blockchain authentication and seek to write to a blockchain immutable ledger stored in blockchain layer 516, a copy of which may also be stored on the underpinning physical infrastructure 514. The blockchain configuration may include one or more applications 524 which are linked to application programming interfaces (APIs) 522 to access and execute stored program/application code 520 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 504-510.

The blockchain base or platform 512 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 516 may expose an interface that provides access to the virtual execution environment necessary to process the program code and engage the physical infrastructure 514. Cryptographic trust services 518 may be used to verify transactions such as asset exchange transactions and keep information private.

The blockchain architecture configuration of FIG. 5A may process and execute program/application code 520 via one or more interfaces exposed, and services provided, by blockchain platform 512. The code 520 may control blockchain assets. For example, the code 520 can store and transfer data, and may be executed by nodes 504-510 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the document attribute(s) information 526 may be processed by one or more processing entities (e.g., virtual machines) included in the blockchain layer 516. The result 528 may include a plurality of linked shared documents. The physical infrastructure 514 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 5B:
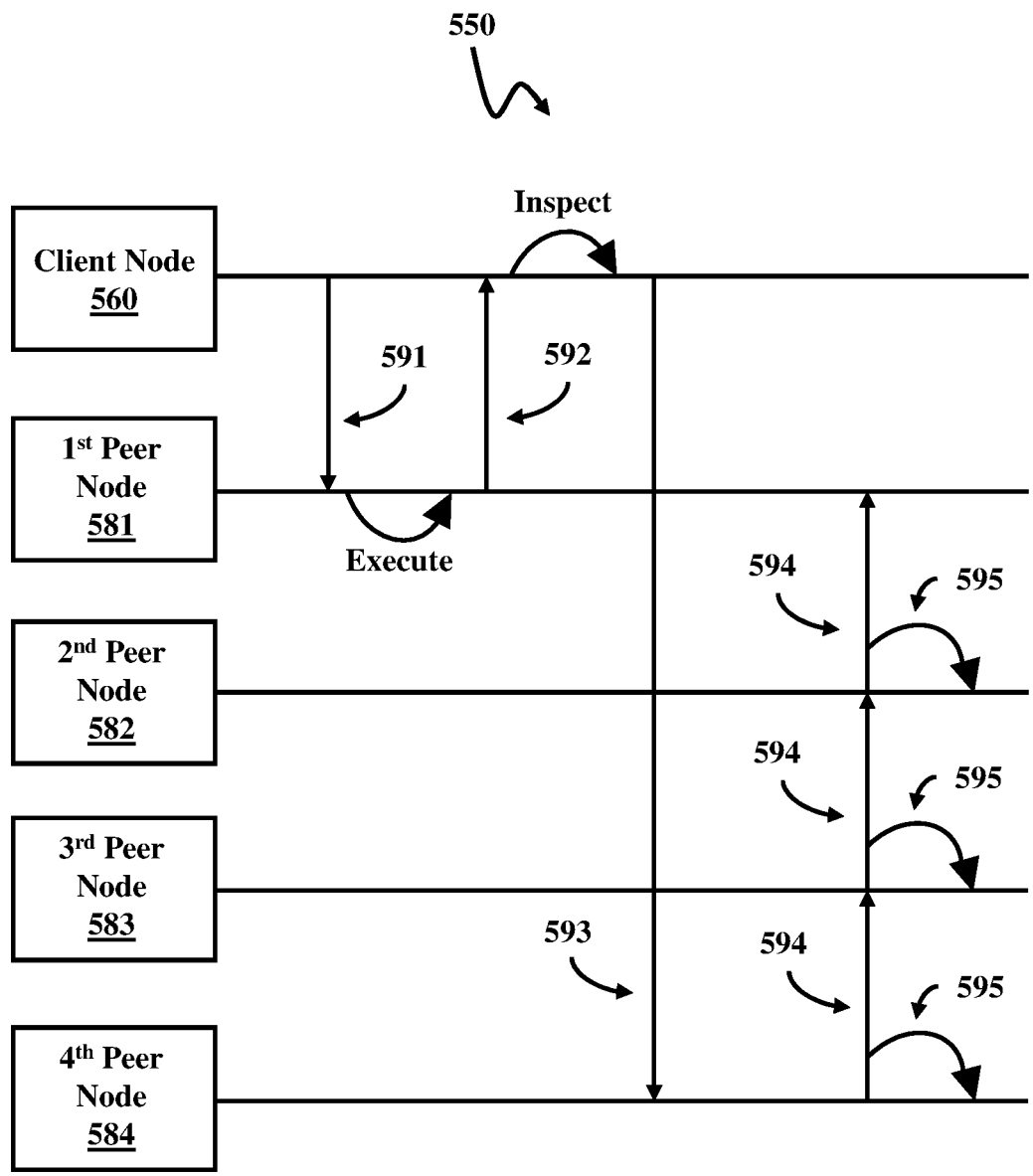
FIG. 5B illustrates a blockchain transactional flow, according to example embodiments.

FIG. 5B illustrates an example of a blockchain transactional flow 550 between nodes of the blockchain in accordance with an example embodiment. Referring to FIG. 5B a general description of transactional flow 550 will be given followed by a more specific example. The transaction flow may include a transaction proposal 591 sent by an application client node 560 to an endorsing peer node 581. The endorsing peer 581 may verify the client signature and execute a chaincode function to initiate the transaction. The output may include the chaincode results, a set of key/value versions that were read in the chaincode (read set), and the set of keys/values that were written in chaincode (write set). The proposal response 592 is sent back to the client 560 along with an endorsement signature, if approved. The client 560 assembles the endorsements into a transaction payload 593 and broadcasts it to an ordering service node 584. The ordering service node 584 then delivers ordered transactions as blocks to all peers 581-583 on a channel. Before committal to the blockchain, each peer 581-583 may validate the transaction. For example, the peers may check the endorsement policy to ensure that the correct allotment of the specified peers have signed the results and authenticated the signatures against the transaction payload 593. In some embodiments, one or more of the peers may be the manager nodes.

A more specific description of transactional flow 550 can be understood with a more specific example. To begin, the client node 560 initiates the transaction 591 by constructing and sending a request to the peer node 581, which is an endorser. The client 560 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 581 may verify (a) that the transaction proposal is well formed, (b) the transaction has not been submitted already in the past (replay-attack protection), (c) the signature is valid, and (d) that the submitter (client 560, in the example) is properly authorized to perform the proposed operation on that channel. The endorsing peer node 581 may take the transaction proposal inputs as arguments to the invoked chaincode function. The chaincode is then executed against a current state database to produce transaction results including a response value, read set, and write set. However, no updates are made to the ledger at this point. In 592, the set of values, along with the endorsing peer node's 581 signature is passed back as a proposal response 592 to the SDK of the client 560 which parses the payload for the application to consume.

In response, the application of the client 560 inspects/verifies the endorsing peers signatures and compares the proposal responses to determine if the proposal response is the same. If the chaincode only queried the ledger, the application may inspect the query response and may typically not submit the transaction to the ordering service node 584. If the client application intends to submit the transaction to the ordering node service 584 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node may need to endorse the transaction. The architecture is such that even if an application selects not to inspect responses or otherwise forwards an unendorsed transaction, the endorsement policy may still be enforced by peers and upheld at the commit validation phase.

After successful inspection, the client 560 assembles endorsements into a transaction 593 and broadcasts the transaction proposal and response within a transaction message to the ordering node 584. The transaction may contain the read/write sets, the endorsing peers signatures and a channel ID. The ordering node 584 does not need to inspect the entire content of a transaction in order to perform its operation. Instead, the ordering node 584 may simply receive transactions from all channels in the network, order them chronologically by channel, and create blocks of transactions per channel.

The blocks of the transaction are delivered from the ordering node 584 to all peer nodes 581-583 on the channel. The transactions 594 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 595 each peer node 581-583 appends the block to the channel's chain, and for each valid transaction the write sets are committed to current state database. An event is emitted to notify the client application that the transaction (invocation) has been immutably appended to the chain, as well as to notify whether the transaction was validated or invalidated.

Figure 6A:
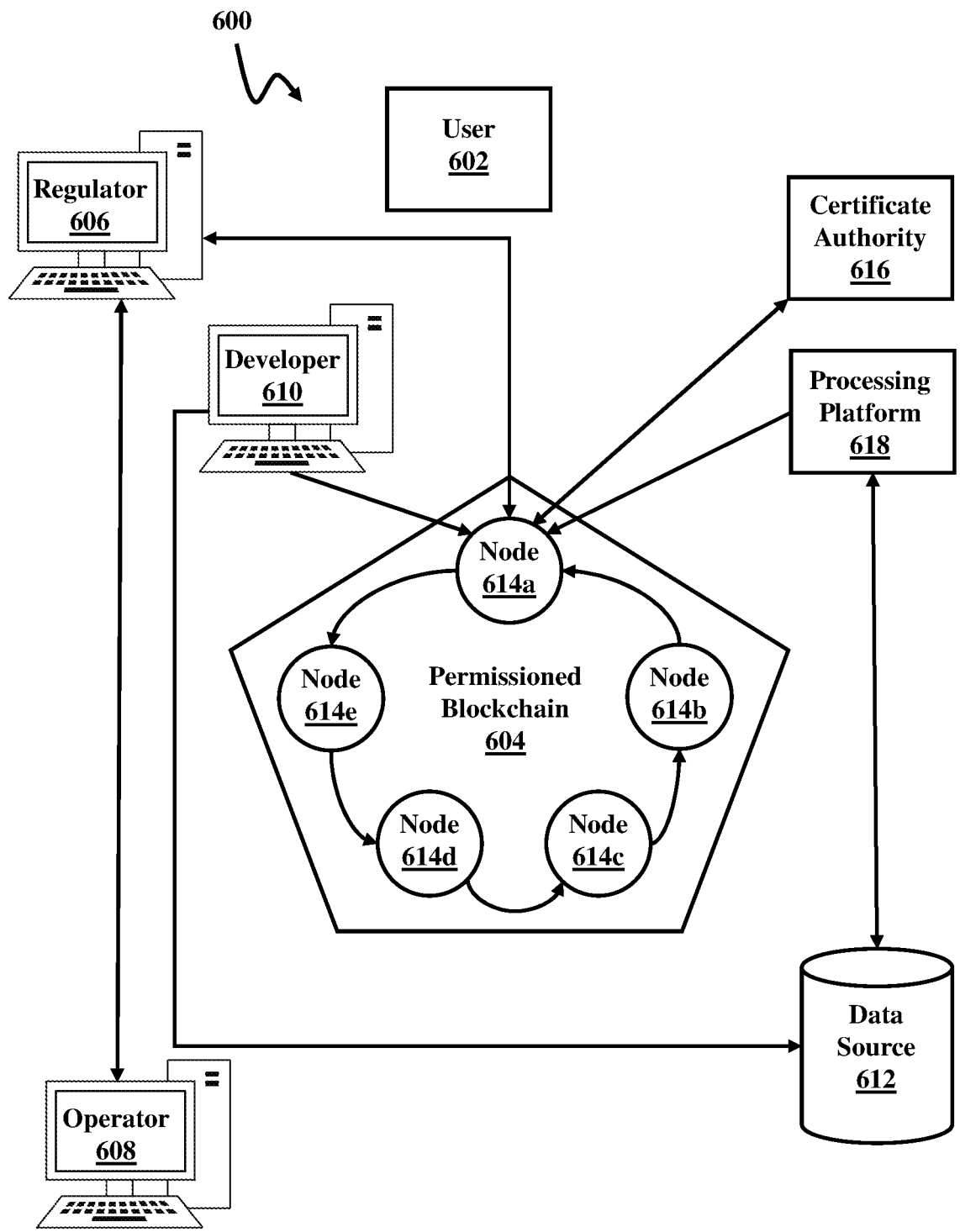
FIG. 6A illustrates a permissioned network, according to example embodiments.

FIG. 6A illustrates an example of a permissioned blockchain network 600, which features a distributed, decentralized peer-to-peer architecture. In this example, a blockchain user 602 may initiate a transaction to the permissioned blockchain 604. In this example, the transaction can be a deploy, invoke, or query, and may be issued through a client-side application leveraging an SDK, directly through an API, etc. Networks may provide access to a regulator 606, such as an auditor. A blockchain network operator 608 manages member permissions, such as enrolling the regulator 606 as an "auditor" and the blockchain user 602 as a "client." An auditor may be restricted only to querying the ledger whereas a client may be authorized to deploy, invoke, and query certain types of chaincode.

A blockchain developer 610 can write chaincode and client-side applications. The blockchain developer 610 can deploy chaincode directly to the network through an interface. To include credentials from a traditional data source 612 in chaincode, the developer 610 may use an out-of-band connection to access the data. In this example, the blockchain user 602 connects to the permissioned blockchain 604 through one of peer nodes 614 (referring to any one of nodes 614*a*-*e*). Before proceeding with any transactions, the peer node 614 (e.g., node 614*a*) retrieves the user's enrollment and transaction certificates from a certificate authority 616, which manages user roles and permissions. In some cases, blockchain users must possess these digital certificates in order to transact on the permissioned blockchain 604. Meanwhile, a user attempting to utilize chaincode may be required to verify their credentials on the traditional data source 612. To confirm the user's authorization, chaincode can use an out-of-band connection to this data through a traditional processing platform 618.

Figure 6B:
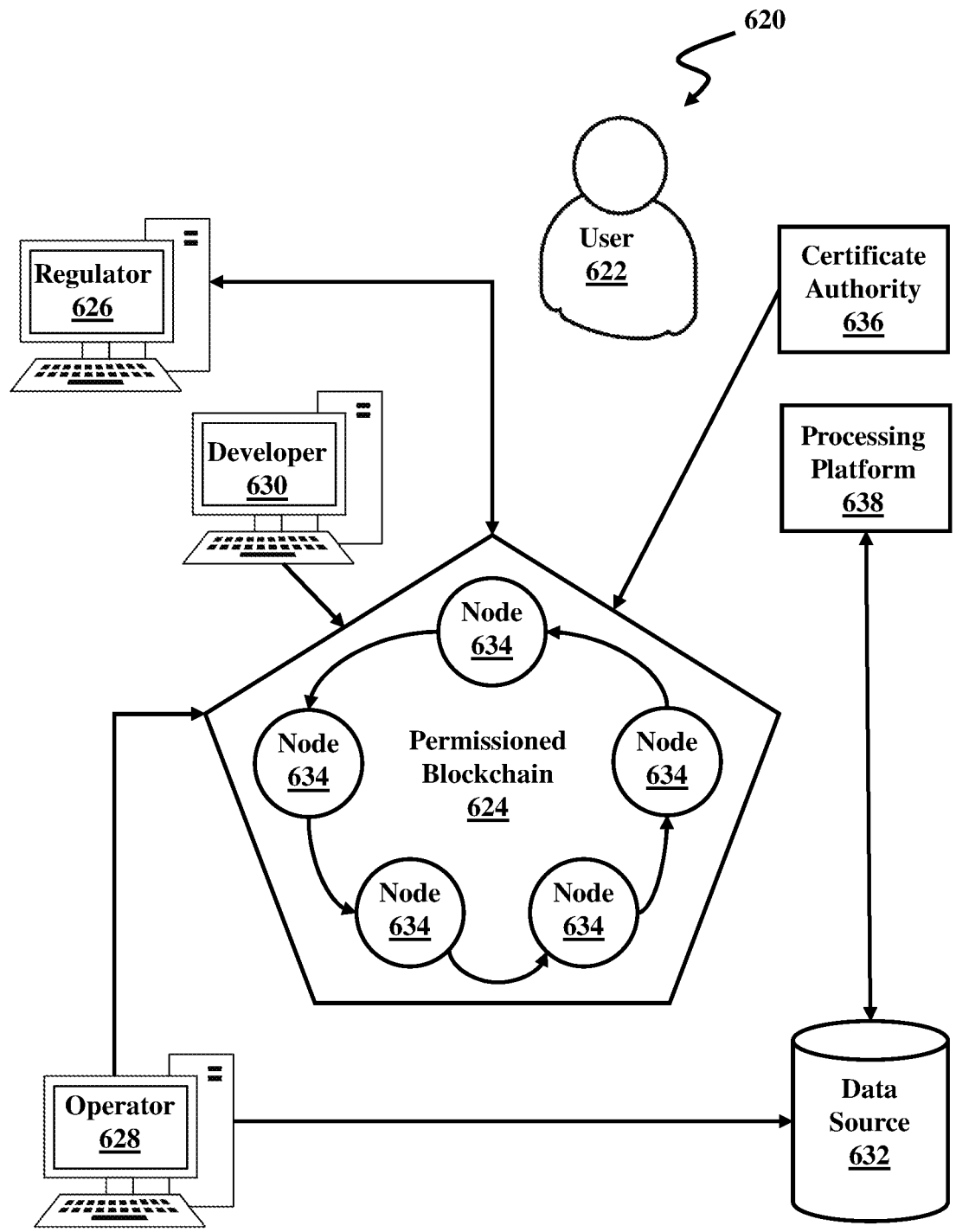
FIG. 6B illustrates another permissioned network, according to example embodiments.

FIG. 6B illustrates another example of a permissioned blockchain network 620, which features a distributed, decentralized peer-to-peer architecture. In this example, a blockchain user 622 may submit a transaction to the permissioned blockchain 624. In this example, the transaction can be a deploy, invoke, or query, and may be issued through a client-side application leveraging an SDK, directly through an API, etc. Networks may provide access to a regulator 626, such as an auditor. A blockchain network operator 628 manages member permissions, such as enrolling the regulator 626 as an "auditor" and the blockchain user 622 as a "client." An auditor may be restricted to only querying the ledger whereas a client may be authorized to deploy, invoke, and query certain types of chaincode.

A blockchain developer 630 writes chaincode and client-side applications. The blockchain developer 630 can deploy chaincode directly to the network through an interface. To include credentials from a traditional data source 632 in chaincode, the developer 630 may use an out-of-band connection to access the data. In this example, the blockchain user 622 connects to the network through a peer node 634. Before proceeding with any transactions, the peer node 634 retrieves the user's enrollment and transaction certificates from the certificate authority 636. In some cases, blockchain users must possess these digital certificates in order to transact on the permissioned blockchain 624. Meanwhile, a user attempting to utilize chaincode may be required to verify their credentials on the traditional data source 632. To confirm the user's authorization, chaincode can use an out-of-band connection to this data through a traditional processing platform 638.

In some embodiments of the present disclosure, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 6C:
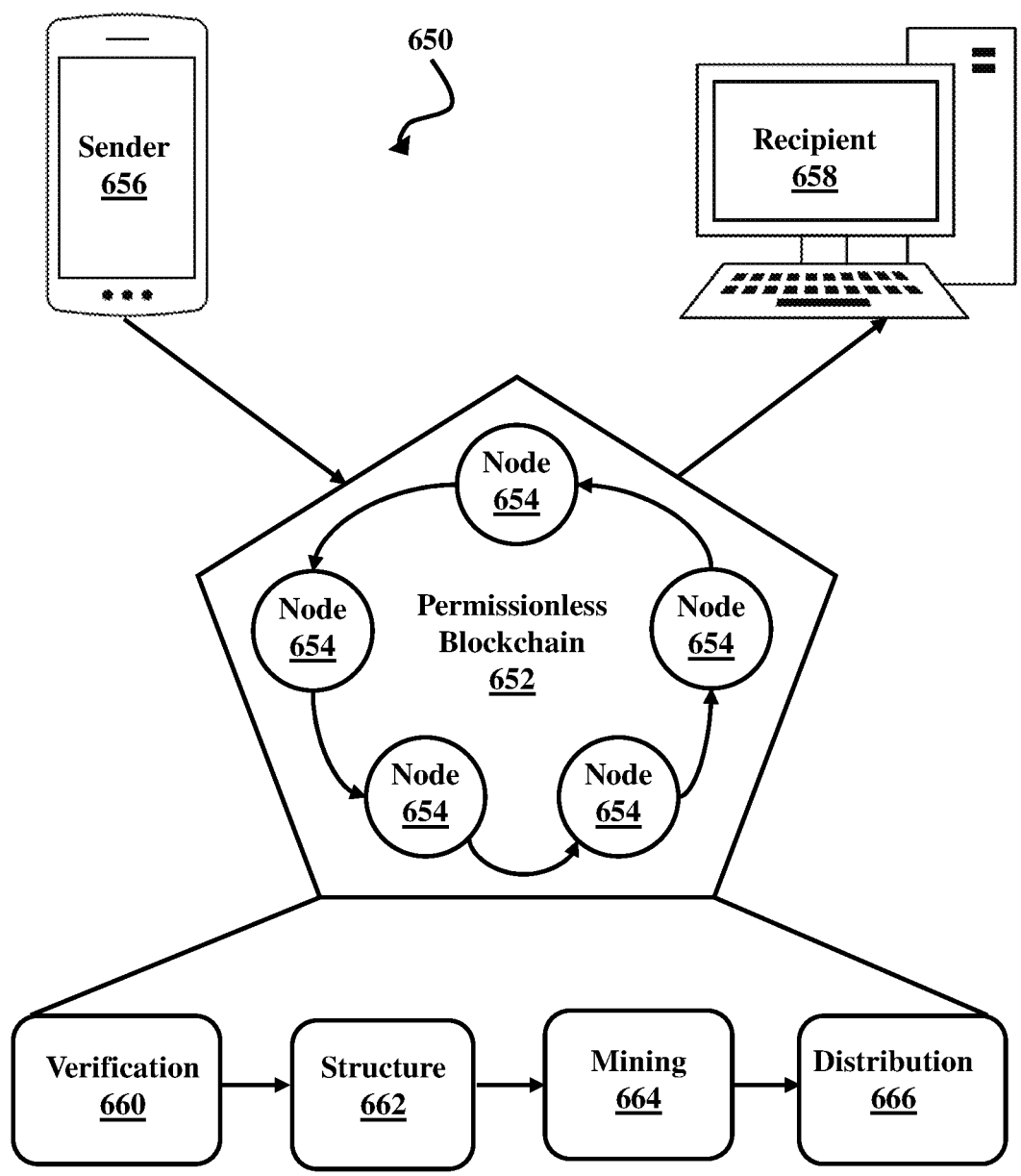
FIG. 6C illustrates a permissionless network, according to example embodiments.

FIG. 6C illustrates a process 650 of a transaction being processed by a permissionless blockchain 652 including a plurality of nodes 654. A sender 656 desires to send payment or some other form of value (e.g., a deed, medical records, a contract, a good, a service, or any other asset that can be encapsulated in a digital record) to a recipient 658 via the permissionless blockchain 652. In some embodiments, each of the sender device 656 and the recipient device 658 may have digital wallets (associated with the blockchain 652) that provide user interface controls and a display of transaction parameters. In response, the transaction is broadcast throughout the blockchain 652 to the nodes 654.

Depending on the blockchain's 652 network parameters the nodes verify 660 the transaction based on rules (which may be pre-defined or dynamically allocated) established by the permissionless blockchain 652 creators. For example, this may include verifying identities of the parties involved, etc. The transaction may be verified immediately or it may be placed in a queue with other transactions and the nodes 654 determine if the transactions are valid based on a set of network rules.

In structure 662, valid transactions are formed into a block and sealed with a lock (hash). This process may be performed by mining nodes among the nodes 654. Mining nodes may utilize additional software specifically for mining and creating blocks for the permissionless blockchain 652. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 652 may include a proof-of-work (PoW) which is a solution to a puzzle derived from the block's header. Although not shown in the example of FIG. 6C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 664, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 666, the successfully validated block is distributed through the permissionless blockchain 652 and all nodes 654 add the block to a majority chain which is the permissionless blockchain's 652 auditable ledger. Furthermore, the value in the transaction submitted by the sender 656 is deposited or otherwise transferred to the digital wallet of the recipient device 658.

Figure 7A:
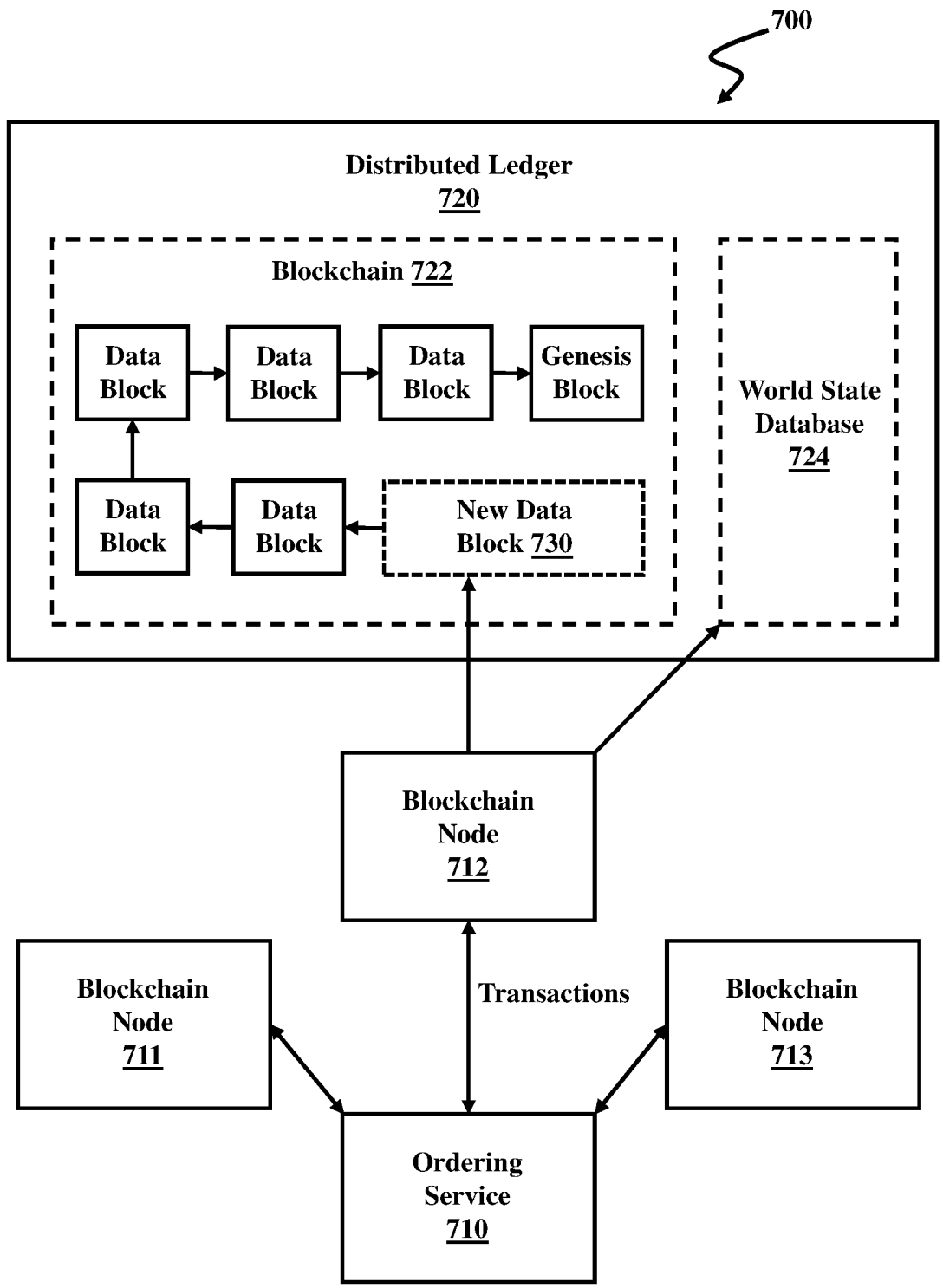
FIG. 7A illustrates a process for a new block being added to a distributed ledger, according to example embodiments.
Figure 7B:
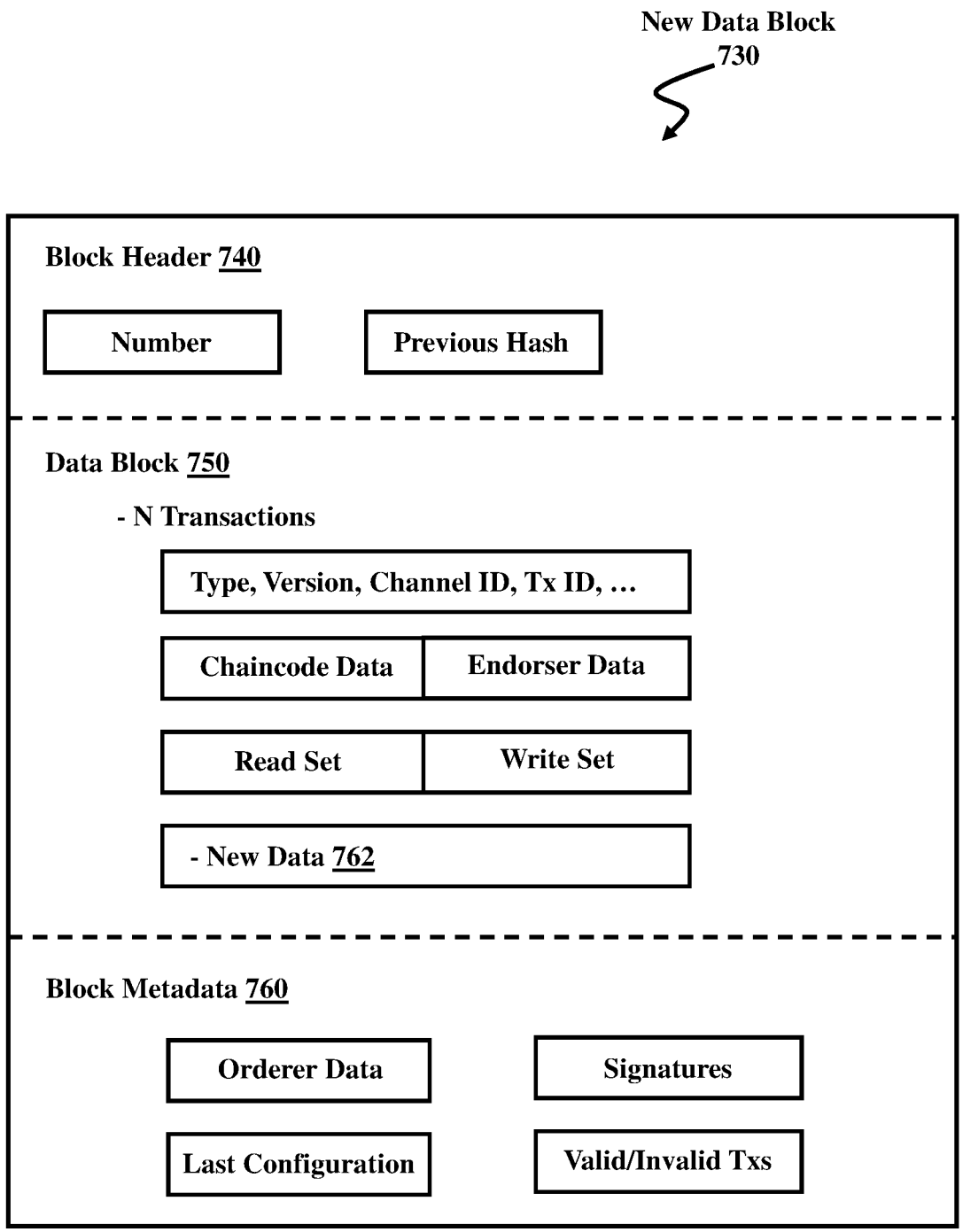
FIG. 7B illustrates contents of a new data block, according to example embodiments.

FIG. 7A illustrates a process 700 of a new block being added to a distributed ledger 720, according to example embodiments, and FIG. 7B illustrates contents of a new data block structure 730 for blockchain, according to example embodiments. The new data block 730 may contain document linking data.

Referring to FIG. 7A, clients (not shown) may submit transactions to blockchain nodes 711, 712, and/or 713. Clients may be instructions received from any source to enact activity on the blockchain 720. As an example, clients may be applications that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720. Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain which stores immutable, sequenced records in blocks, and a state database 724 (current world state) maintaining a current state of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 722 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys are stored in the state database 724. The state database 724 may include an indexed view into the transaction log of the blockchain 722, it can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data new data block 730 for storage on blockchain 720. The first block in the blockchain may be referred to as a genesis block which includes information about the blockchain, its members, the data stored therein, etc.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network.

When the ordering service 710 initializes a new data block 730, the new data block 730 may be broadcast to committing peers (e.g., blockchain nodes 711, 712, and 713). In response, each committing peer validates the transaction within the new data block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block may still be included in that block, but it may be marked as invalid, and the state database 724 may not be updated.

Referring to FIG. 7B, a new data block 730 (also referred to as a data block) that is stored on the blockchain 722 of the distributed ledger 720 may include multiple data segments such as a block header 740, block data 750, and block metadata 760. It should be appreciated that the various depicted blocks and their contents, such as new data block 730 and its contents. Shown in FIG. 7B are merely examples and are not meant to limit the scope of the example embodiments. The new data block 730 may store transactional information of N transaction(s) (e.g., 1, 10, 100, 500, 1000, 2000, 3000, etc.) within the block data 750. The new data block 730 may also include a link to a previous block (e.g., on the blockchain 722 in FIG. 7A) within the block header 740. In particular, the block header 740 may include a hash of a previous block's header. The block header 740 may also include a unique block number, a hash of the block data 750 of the new data block 730, and the like. The block number of the new data block 730 may be unique and assigned in various orders, such as an incremental/sequential order starting from zero.

The block data 750 may store transactional information of each transaction that is recorded within the new data block 730. For example, the transaction data may include one or more of a type of the transaction, a version, a timestamp, a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 750 may also store new data 762 which adds additional information to the hash-linked chain of blocks in the blockchain 722. The additional information includes one or more of the steps, features, processes and/or actions described or depicted herein. Accordingly, the new data 762 can be stored in an immutable log of blocks on the distributed ledger 720. Some of the benefits of storing such new data 762 are reflected in the various embodiments disclosed and depicted herein. Although in FIG. 7B the new data 762 is depicted in the block data 750 but may also be located in the block header 740 or the block metadata 760. The new data 762 may include a document composite key that is used for linking the documents within an organization.

The block metadata 760 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 712) may add validity/invalidity information based on an endorsement policy, verification of read/write sets, and the like. The transaction filter may include a byte array of a size equal to the number of transactions in the block data 750 and a validation code identifying whether a transaction was valid/invalid.

Figure 7C:
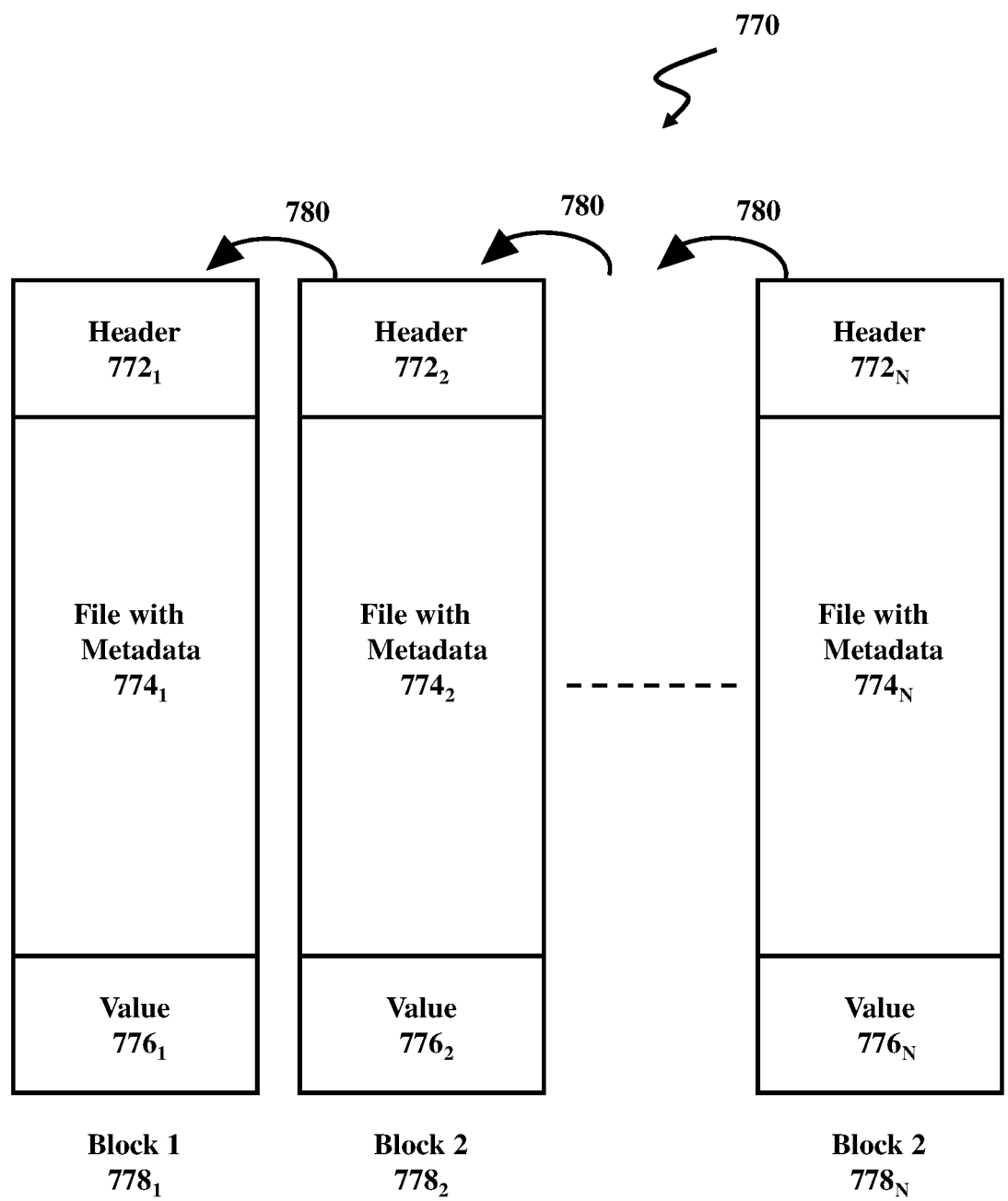
FIG. 7C illustrates a blockchain for digital content, according to example embodiments.

FIG. 7C illustrates an embodiment of a blockchain 770 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In some embodiments, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In some embodiments, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value ... Content |
| . | . |
| . | . |
| . | . |
| Block N Hash Value | Block N Hash Value ... Content |

In the example embodiment of FIG. 7C, the blockchain 770 includes a number of blocks 7781, 7782, ... 778N cryptographically linked in an ordered sequence, where N≥1. The encryption used to link the blocks 7781, 7782, ... 778N may be any of a number of keyed or un-keyed Hash functions. In some embodiments, the blocks 7781, 7782, ... 778N are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In other embodiments, the blocks 7781, 7782, ... , 778N may be cryptographically linked by a function that is different from a hash function. For purposes of illustration, the following description is made with reference to a hash function, e.g., SHA-2.

Each of the blocks 7781, 7782, ... , 778N in the blockchain includes a header, a version of the file, and a value. The header and the value are different for each block as a result of hashing in the blockchain. In some embodiments, the value may be included in the header. As described in greater detail below, the version of the file may be the original file or a different version of the original file.

The first block 7781 in the blockchain is referred to as the genesis block and includes the header 7721, original file 7741, and an initial value 7761. The hashing scheme used for the genesis block, and indeed in all subsequent blocks, may vary. For example, all the information in the first block 7781 may be hashed together and at one time, or each or a portion of the information in the first block 7781 may be separately hashed and then a hash of the separately hashed portions may be performed.

The header 7721 may include one or more initial parameters, which, for example, may include a version number, timestamp, nonce, root information, difficulty level, consensus protocol, duration, media format, source, descriptive keywords, and/or other information associated with original file 7741 and/or the blockchain. The header 7721 may be generated automatically (e.g., by blockchain network managing software) or manually by a blockchain participant. Unlike the header in other blocks 7782 to 778N in the blockchain, the header 7721 in the genesis block does not reference a previous block, simply because there is no previous block.

The original file 7741 in the genesis block may be, for example, data as captured by a device with or without processing prior to its inclusion in the blockchain. The original file 7741 is received through the interface of the system from the device, media source, or node. The original file 7741 is associated with metadata, which, for example, may be generated by a user, the device, and/or the system processor, either manually or automatically. The metadata may be included in the first block 7781 in association with the original file 7741.

The value 7761 in the genesis block is an initial value generated based on one or more unique attributes of the original file 7741. In some embodiments, the one or more unique attributes may include the hash value for the original file 7741, metadata for the original file 7741, and other information associated with the file. In one implementation, the initial value 7761 may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks 7782 to 778N in the blockchain also have headers, files, and values. However, unlike header 7721 the first block, each of the headers 7722 to 772N in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 780, to establish an auditable and immutable chain-of-custody.

Each of the header 7722 to 772N in the other blocks may also include other information, e.g., version number, timestamp, nonce, root information, difficulty level, consensus protocol, and/or other parameters or information associated with the corresponding files and/or the blockchain in general.

The files 7742 to 774N in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks 7762 to 776N in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file may include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 7D:
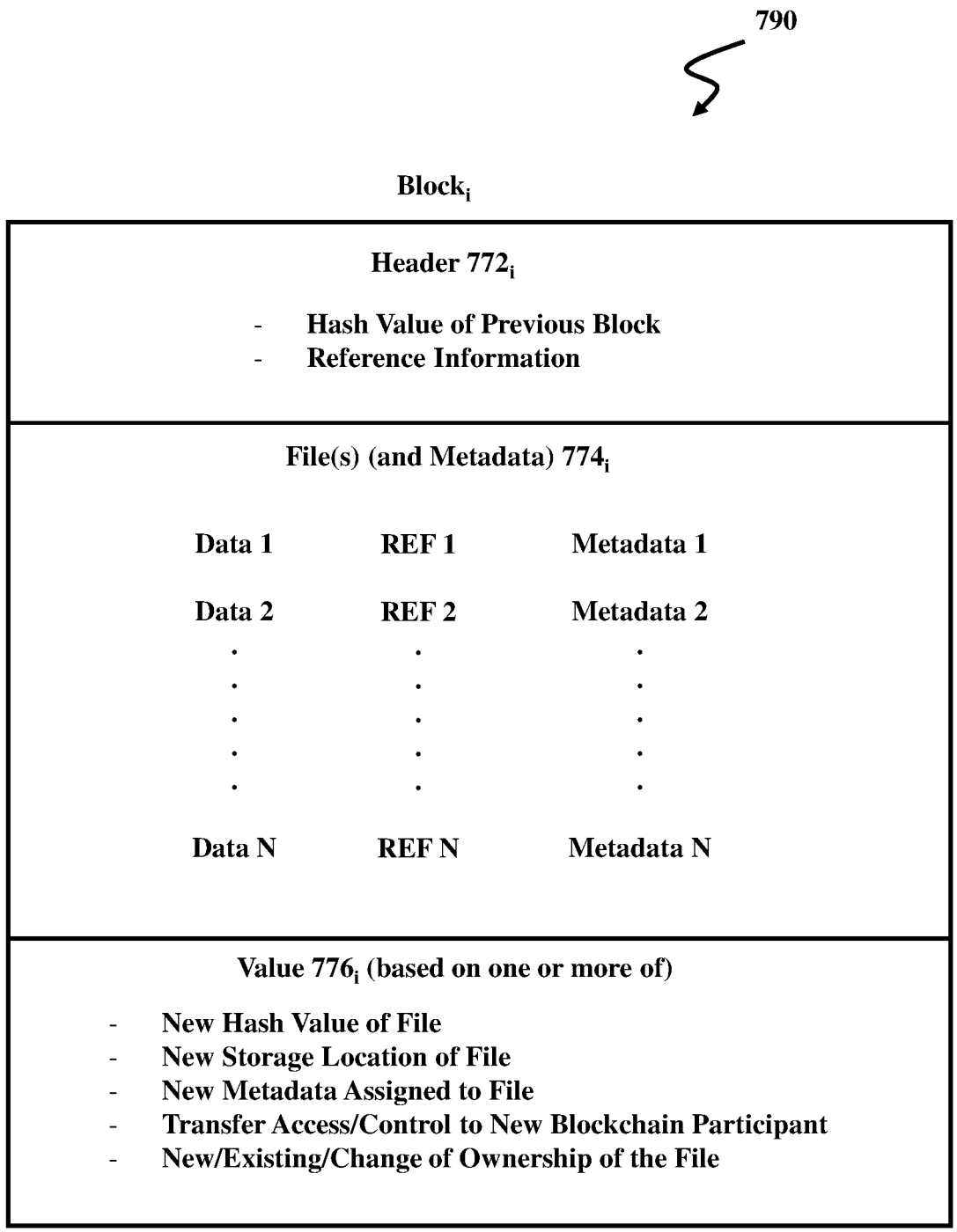
FIG. 7D illustrates a block which may represent the structure of blocks in the blockchain, according to example embodiments.

In some embodiments, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)

b) new storage location for the file c) new metadata identified associated with the file d) transfer of access or control of the file from one blockchain participant to another blockchain participant FIG. 7D illustrates an embodiment of a block which may represent the structure of the blocks in the blockchain 790 in accordance with one embodiment. The block, Blocki, includes a header 772$i$, a file 774$i$, and a value 776$i$.

The header 772$i$ includes a hash value of a previous block Blocki−1 and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file 774$i$ includes a plurality of data, such as Data 1, Data 2, . . . , Data N in sequence. The data are tagged with Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference REF1, REF2, . . . , REFN to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value 776$i$ is a hash value or other value computed based on any of the types of information previously discussed. For example, for any given block Blocki, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 770 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last (Nth) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender may have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
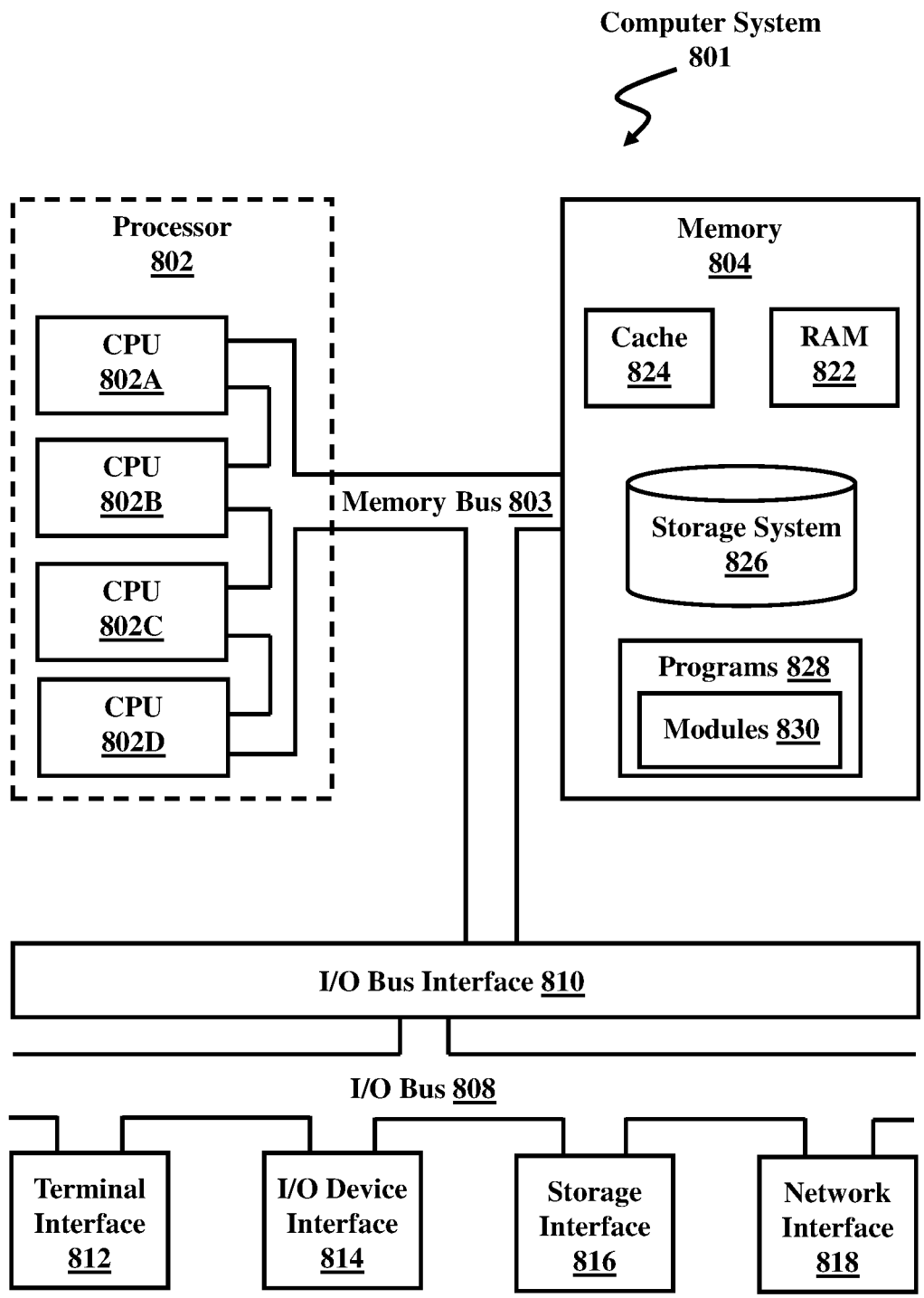
FIG. 8 illustrates a high-level block diagram of an example computer system that may be used in implementing one or more of the methods, tools, and modules, and any related functions, described herein, in accordance with embodiments of the present disclosure.

FIG. 8, illustrated is a high-level block diagram of an example computer system 801 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 816, an I/O (Input/Output) device interface 814, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

System memory 804 may include computer system readable media in the form of volatile memory, such as random access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smartphone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

What is claimed is:

1. A method comprising:
generating a configuration override for a configuration of a blockchain network;
generating a threshold signature scheme;
obtaining, by an organization, a share of a private key;
authorizing, by the organization, the configuration override with the share of the private key,
wherein the approving is based on surpassing a cryptographic threshold of authorizations for the configuration override passing the threshold signature scheme;
approving the configuration override by the blockchain network;
transmitting the approval for the configuration override to peers in the blockchain network; and
submitting the configuration override to the blockchain network for validation, wherein the validation is based on the configuration override matching the approval.

2. The method of claim 1, wherein the approving is performed out-of-band by an organization of the blockchain network.

3. The method of claim 2, wherein the transmitting is performed by the organization and is transmitted to the peers owned by the organization.

4. The method of claim 1, wherein the organization must have a minimum stake to obtain the share, wherein a minimum stake is established by the threshold signature scheme.

5. The method of claim 1, wherein the configuration override is stored on a list of approved configuration overrides that is stored locally on the peers.

6. The method of claim 1, wherein the approval transmitted to the peers contains a hash of the configuration override.

7. A system comprising:
a memory; and
a processor in communication with the memory, the processor being configured to perform operations comprising:
generating a configuration override for a configuration of a blockchain network;
generating a threshold signature scheme;
obtaining, by an organization, a share of a private key;
authorizing, by the organization, the configuration override with the share of the private key,
wherein the approving is based on surpassing a cryptographic threshold of authorizations for the configuration override passing the threshold signature scheme;
approving the configuration override by the blockchain network;
transmitting the approval for the configuration override to peers in the blockchain network; and
submitting the configuration override to the blockchain network for validation, wherein the validation is based on the configuration override matching the approval.

8. The system of claim 7, wherein the approving is performed out-of-band by an organization of the blockchain network.

9. The system of claim 8, wherein the transmitting is performed by the organization and is transmitted to the peers owned by the organization.

10. The system of claim 7, wherein the organization must have a minimum stake to obtain the share, wherein a minimum stake is established by the threshold signature scheme.

11. The system of claim 7, wherein the configuration override is stored on a list of approved configuration overrides that is stored locally on the peers.

12. The system of claim 7, wherein the approval transmitted to the peers contains a hash of the configuration override.

13. A computer program product comprising a computer readable storage medium having program instructions embodied therewith, the program instructions executable by a processor to cause the processors to perform a function, the function comprising:
generating a configuration override for a configuration of a blockchain network;
generating a threshold signature scheme;
obtaining, by an organization, a share of a private key;
authorizing, by the organization, the configuration override with the share of the private key,
wherein the approving is based on a surpassing a cryptographic threshold of authorizations for the configuration override passing the threshold signature scheme;
approving the configuration override by the blockchain network;
transmitting the approval for the configuration override to peers in the blockchain network; and
submitting the configuration override to the blockchain network for validation, wherein the validation is based on the configuration override matching the approval.

14. The computer program product of claim 13, wherein the approving is performed out-of-band by an organization of the blockchain network.

15. The computer program product of claim 14, wherein the transmitting is performed by the organization and is transmitted to the peers owned by the organization.

16. The computer program product of claim 13, wherein the organization must have a minimum stake to obtain the share, wherein a minimum stake is established by the threshold signature scheme.

17. The computer program product of claim 13, wherein the configuration override is stored on a list of approved configuration overrides that is stored locally on the peers.

* * * * *